United States Patent [19]

Destannes

[11] Patent Number: 5,588,018
[45] Date of Patent: Dec. 24, 1996

[54] METALLURGICAL CONTAINER COMPRISING A HEARTH BOTTOM ELECTRODE

[75] Inventor: Philippe Destannes, Metz, France

[73] Assignees: Usinor Sacilor Societe, Puteaux; Clecim Societe, Cergy Pontoise Cedex, both of France

[21] Appl. No.: 324,094

[22] Filed: Oct. 14, 1994

[30] Foreign Application Priority Data

Oct. 15, 1993 [FR] France ................ 93 12471

[51] Int. Cl.$^6$ ............................... H05B 7/02
[52] U.S. Cl. ................ 373/72; 373/52; 373/94; 373/108
[58] Field of Search .............. 373/60, 69, 71, 373/72, 94, 52, 108

[56] References Cited

U.S. PATENT DOCUMENTS

| | | | |
|---|---|---|---|
| 1,645,091 | 10/1927 | Chapman | 373/72 |
| 4,423,512 | 12/1983 | Lugscheider et al. | 373/22 |
| 4,566,108 | 1/1986 | Buhler | 373/108 |
| 4,685,112 | 8/1987 | Michelet et al. | 373/72 |
| 4,754,464 | 6/1988 | Feuerstake | 373/72 |
| 5,233,625 | 8/1993 | Hofmann et al. | 373/94 |

FOREIGN PATENT DOCUMENTS

| | | |
|---|---|---|
| 0472254 | 2/1929 | European Pat. Off. . |
| 0056225 | 7/1982 | European Pat. Off. . |
| 0133925 | 3/1985 | European Pat. Off. . |
| 2577311 | 8/1986 | France . |
| 2184527 | 6/1987 | United Kingdom . |

*Primary Examiner*—Tu Hoang
*Attorney, Agent, or Firm*—Nilles & Nilles, S.C.

[57] ABSTRACT

A metallurgical container of the type having a vessel having a bottom wall and an inner refractory lining includes a hearth bottom electrode extending through the bottom wall and the lining and including, in a superposed condition, a bar and a connector. The bar is flush with the surface of the refractory lining. The connector is fastened to a lower surface of the bar, is internally cooled, has a diameter smaller than the diameter of the bar, and is attached to the bar at its upper front face at a level within the thickness of the refractory lining. A ring is interlocked to the vessel wall, surrounds the connector, and has an upper face located below the bar so as to be capable of carrying the bar. In order to prevent liquid materials from penetrating by infiltration between the bar and the ring, the bar is prolonged or elongated toward the bottom wall by a skirt which surround the connector laterally. The invention is particularly applicable to direct current operated steel plant arc furnaces.

18 Claims, 1 Drawing Sheet

METALLURGICAL CONTAINER COMPRISING A HEARTH BOTTOM ELECTRODE

BACKGROUND OF THE INVENTION

The invention relates to a metallurgical container comprising at least one hearth bottom electrode, for example a steel plant arc furnace operated with direct current.

Such a container comprises, generally speaking, a metallic vessel internally lined with refractory material and at least a device for the current supply, usually called "hearth bottom electrode", which passes through the bottom of the container in order to provide the feedthrough of electric current between a source of electric energy and the charge of metallic material to be molten and/or to be heated, which is in the interior of the container.

In the case of a direct current steel plant arc furnace, the container comprises also at least one roof electrode connected to the source of electric current. The electrode is put in place above the charge and is movable vertically, so as to create between the charge and the roof electrode an electric arc.

Several types of hearth bottom electrodes are known, particularly an electrode having a cylindrical general shape and comprising a metallic bar, whose upper end is flush with the surface of the refractory lining and whose other end is linked to a connector constituted by a conductive material which projects below the vessel and is connected to a source of current. Such an electrode is described in the document FR-A-2577311. The upper part of the bar, which partly melts during operation, is generally made out of steel in the case of a steel plant furnace, whereas the connector with its inner cooled parts is formed of copper or of a copper alloy. According to a particular embodiment, described in the document EP-A-472254, the interface between these two parts is situated at a level located within the thickness of the refractory lining, sufficiently high to avoid as far as possible the heating and the partial melting of the bar. In view of the bearing of this electrode, it is foreseen that the upper part should have a diameter which is greater than that one of the lower part in order to form a shoulder which is resting on a ring surrounding the lower part and is rigidly tied up to the vessel.

It is moreover known that during the use of these furnaces, and as a result of the melting and resolidification cycles of the upper part of the hearth bottom electrode, this latter undergoes during each cycle a slight displacement along its axial direction. The displacements accumulated during the cycles are responsible for a rising of the electrode towards the inside of the furnace. In order to avoid this rising of the electrode it has been considered, in assemblings which are of a type different from that one described above, to provide the hearth bottom electrode with return movement means intended to oppose these displacements.

Thus, in the already cited document FR-A-2577311, a hearth bottom electrode has been described which is constituted by a steel bar with a constant diameter whose lower end is surrounded by a cooled jacket. In this case the lower end of the bar is mechanically tied up to the vessel of the furnace with the help of supporting means, which latter also comprise means for the elastic return movement of the electrode towards a lower level.

The application of such means to the hearth bottom electrode of the type described in the first place, however, does not allow to effectively and durably prevent its rising, due to the fact that materials can penetrate, for example by infiltration, between the shoulder of the bar and the ring, and prevent the return movement of the electrode towards the lower level.

During the course of a campaign of operation of the furnace, the accumulated displacements of the electrode towards a higher level may result not only in a reduction of the height of the bar due to a consumption of the electrode starting from the upper side, but also in a bringing the lower cooled connector dangerously close to the front of the heat.

OBJECTS AND SUMMARY OF THE INVENTION

The present invention aims to solve these problems and to avoid any durable rising of the metal bar, and to ensure in this way a longer lifetime for the hearth bottom electrode, and to reduce the risk of a contact of the molten metal with the cooled connector.

Having these objectives in mind, the invention is concerned with a metallic container equipped with a hearth bottom electrode and comprising:

- a vessel and an inner refractory lining of the vessel;
- a hearth bottom electrode extending through the wall of the bottom of the vessel and the lining and comprising, in a superposed condition, a bar which is flush with the surface of the refractory lining and a connector which is fastened under the bar, the connector being internally cooled, of a diameter smaller than that one of the bar, and tied up to this bar by its upper front surface at a level situated within the thickness of the refractory lining; and
- a ring, interlocked with the vessel, which surrounds the connector and whose upper face is located below the bar intended to support it.

According to the invention, the container is characterized in that the bar is prolonged towards the wall of the bottom with a skirt which surrounds the cooled connector laterally.

According to the invention, the phenomenon of the progressive rising of the electrode can be avoided. indeed, this rising occurs during the resolidification of the upper part of the electrode and the cooling of the whole construction, the upper end of the electrode remaining blocked at the level of the surface of the refractory hearth bottom and the lower end of the electrode being drawn upwardly as a result of the cooling shrinkage. The means for the elastic return movement mentioned above allow as a rule to bring the electrode back in its initial position, as soon as, at the beginning of the next melting cycle, the upper end melts again, thus removing the sticking, and allows the lowering of the electrode.

However, during the lifting of the electrode a clearance builds up between the shoulder and the supporting ring. Materials derived from the molten bath, in particular heavy metals with a low melting point which have infiltrated into the refractory lining, may then, while they are still liquid, penetrate into the clearance and solidify therein, preventing thereafter the return of the electrode.

The invention prevents these infiltrations from penetrating into the unavoidable clearance generated between the electrode and the ring by lowering the lower edge of the bar down to a level which is sufficiently cold so that liquid infiltrations do not any longer occur.

According to a first embodiment of the invention, the supporting ring is located beneath the lower edge of the skirt, the latter being preferably in contact with the lateral surface of the connector. Thus, the skirt is itself cooled.

Cooling the short promotes, the solidification of liquid infiltration and consequently, inhibits the liquid infiltrations from coming close to it.

According to another embodiment, the inner diameter of the skirt is greater than the outer diameter of the connector, and the ring penetrates upwardly between the skirt and the connector. In this case the clearance, which creates itself between the electrode and the ring during the lifting of the electrode, is covered by the skirt acting as a deflector against the infiltrations.

Preferably an annular space, whose outer diameter is at least equal to that one of the skirt, is arranged between the lower edge of the skirt, the ring and the refractory lining. This arrangement prevents infiltrations, which would come under the skirt, between the said skirt and the nearby refractory material, from coming into this place.

BRIEF DESCRIPTION OF THE DRAWINGS

Other characteristics and advantages will become apparent from the following description of a steel plant direct current electric arc furnace according to the invention, reference being made to the attached drawings wherein.

DETAILED DESCRIPTION OF THE PREFERRED EMBODIMENTS

Figure 1:
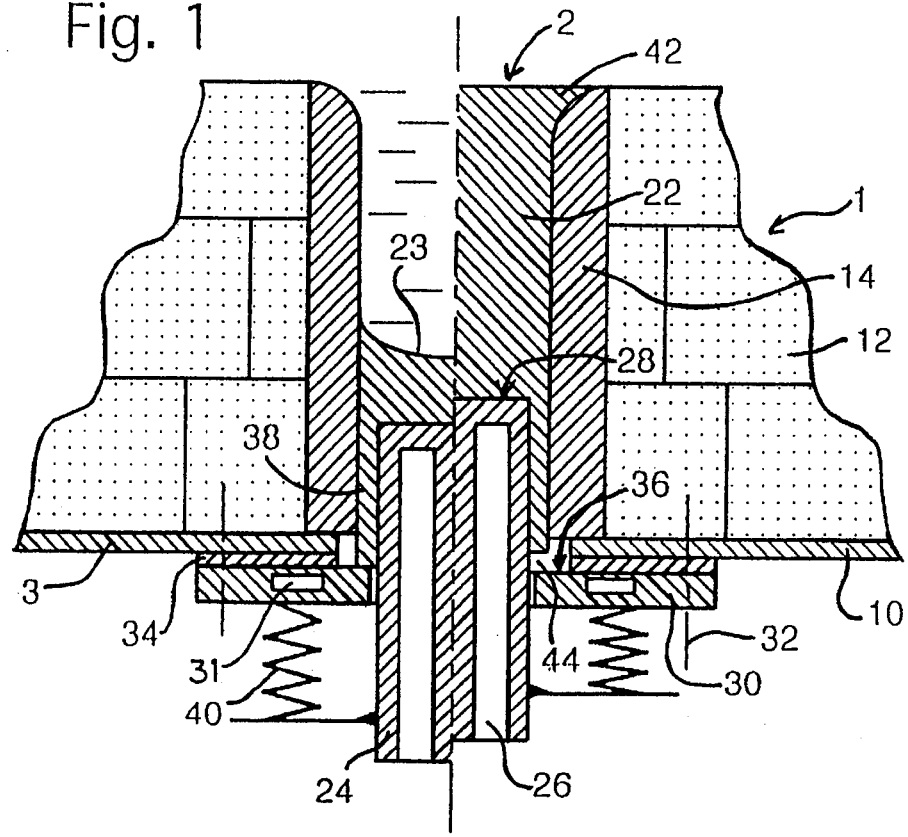
FIG. 1 is a schematic partial sectional view of the bottom area of the furnace comprising a hearth bottom electrode according to a first embodiment.

FIG. 1 represents the bottom area of a direct current steel plant arc furnace 1, wherein a hearth bottom electrode 2 has been installed. The furnace comprises a metallic vessel 3 having a bottom wall 10, an inner refractory lining 12 of refractory material constituting the hearth, as well as a sleeve brick 14, also constituted by a refractory material and forming part of the refractory lining, surrounding the electrode 2 which passes substantially perpendicularly through the bottom wall 10 and the refractory hearth.

The hearth bottom electrode 2 comprises two parts:

an upper part, or bar 22, made of steel, whose upper end is flush with the surface of the refractory hearth and provides the electric contact with the materials constituting the metal bearing charge of the furnace (not shown) and, a lower part, or connector 24, made of a metal being a good conductor for electricity and heat, for example copper.

The connector 24 is internally cooled by a circulation or a projection of a cooling fluid in the inside of channels 26 provided in the interior of the connector. It is linked by non illustrated connecting means to a source of electric current. Moreover, it is tied up, through the intermediary of its upper front face 28, to the bar 22, by welding, brazing or by any other bonding method allowing to obtain a good electrical and thermal contact. This bond is situated at a level located within the thickness of the refractory material 12 so that the connector 24 penetrates into the interior of the vessel of the furnace and that the cooling effect operated on the bar 22 extends out sufficiently high so as to avoid that, during operation, the melting front 23 of the bar 22 comes too close to the bottom wall 10.

A ring 30 is linked to the wall 10 of the vessel with the help of fastening means, represented only by their axis 32, while being at the same time electrically insulated with respect to the wall 10 by an insulating element 34.

The ring 30 surrounds the connector 24, and its upper face 36 bears the skirt 38 constituted by a downward prolongation of the bar 22, this skirt 38 surrounding the upper part of the connector 24.

A system for the elastic return movement, such as springs 40, is placed between the ring 30 and the lower end of the connector 24, in order to exert on the latter a downwardly oriented load.

On the left hand side of FIG. 1, the device is shown in the position that it will occupy either during the mounting of the electrode, prior to any operation, or when the upper part of the bar 22 is molten, during the operation of the furnace. On the right hand side, the electrode is shown in the position that it will occupy after the resolidification of the bar, as a result of a stop of the furnace which is sufficiently long to allow the resulting cooling to entail this resolidification.

In this latter position, and due to the cooling and solidification shrinking of bar 22, the lower part of the latter, the skirt 38 and the connector 24 are shifted upwardly, the upper end of the bar 22 being blocked against the refractory sleeve brick 14 due to the widening 42 resulting from the unavoidable erosion of the refractory material.

As a result hereof a clearance 44 will appear between the lower edge of the skirt 38 and the ring 30. However, as this clearance is located very low, at the level of the wall 10 of the vessel, and consequently in a sufficiently cold area, there exists no risk that liquid materials, such as heavy metals having a low melting point as for example lead, which would have infiltrated into the lining 12 or the refractory sleeve brick 14, could enter into this clearance 44. Indeed, these potential infiltrations would have cooled down and solidified before reaching the cold area where the clearance is located.

The blocking of these infiltrations is all the more pronounced since, as illustrated, the skirt 38 is in contact with the connector 24 and it is consequently directly cooled by the latter, this contributing to the lowering of the temperature of the refractory material in the vicinity of the lower part of the skirt.

As a result of these effects the clearance 44 remains free, and, when the electrode is drawn downwardly through the action of the springs 40 and due to a partial remelting of the bar 22, it can come back into its initial position illustrated on the left hand side of the figure, where the skirt 38 is resting on the ring 30.

In this way, during the melting and resolidification cycles of the bar 22, the electrode can always come back into its low position, whereas, if materials succeed in penetrating into the clearance 44, the return movement of the electrode towards the low position cannot be brought into effect completely, and this leads progressively to an irreversible upward displacement of the electrode.

It is worth noting that the return movement of the electrode towards the low position could also be operated by the effect of its own weight.

Preferably the ring 30 can include cooling means, for example channels 31 for circulating a cooling fluid, as this measure further improves the maintaining of a low temperature in the area close to the lower part of the skirt 38.

Figure 2:
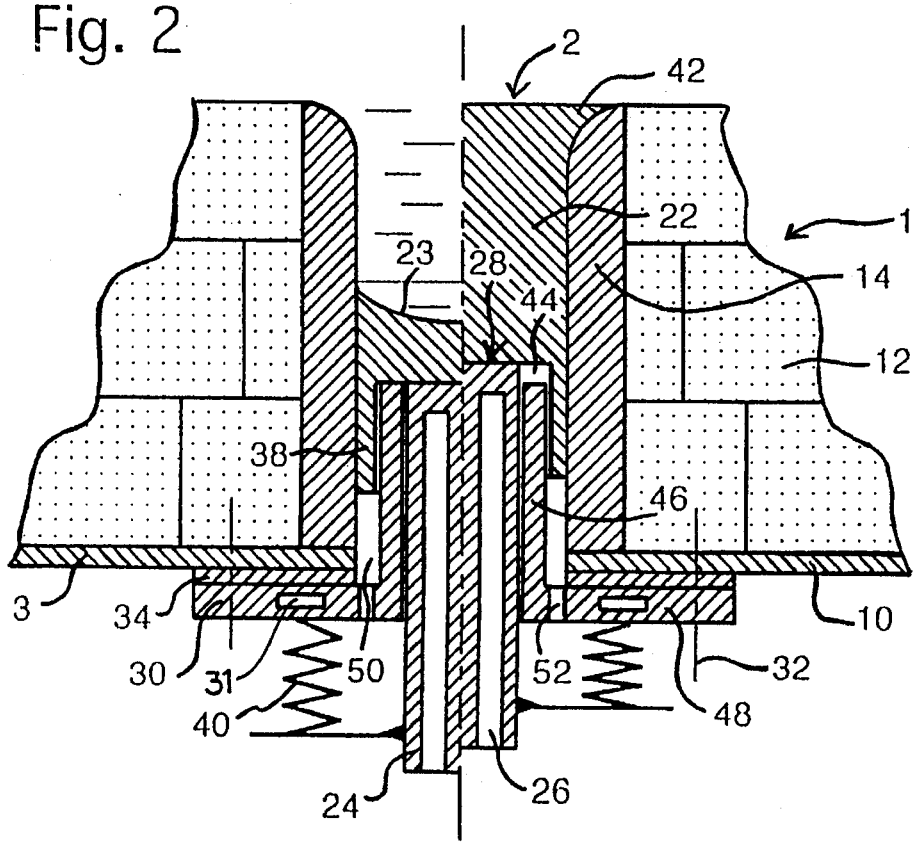
FIG. 2 is a similar view according to a second embodiment.

Another embodiment of the invention is shown in the drawing of FIG. 2. In this variant the supporting ring 30 of the electrode comprises a tubular part 46 which surrounds the upper part of the connector 24 and extends upwardly, starting at the connector's base, which has the shape of a collar 48 linked to the wall 10, up to the height of the upper front face 28 of the connector 24.

The inner diameter of the skirt 38 is greater than the diameter of the connector 24, so as to provide between these pieces a space into which the tubular part 46 of the ring 30 is allowed to penetrate.

In this variant the electrode 2 rests not any longer on the ring 30 by the lower edge of the skirt 38, but by the surface of the bar constituting the ground of the annular space delimited between the connector 24 and the skirt 38, such as it has been represented on the left hand part of FIG. 2. It is consequently in this area that the clearance 44 is created between the bar 22 and the ring 30 during the assembling of the electrode.

This clearance is consequently located in a relatively hot area, but, as it is covered by the skirt 38, no infiltration can penetrate into this space.

The skirt 38 does not reach down to the level of the wall 10 of the vessel. It is sufficient that its height is able to cover the clearance 44 with a good security range, this meaning that the height of the skirt is superior to the maximum value that can be reached by this clearance.

An annular free space 50, of an outer diameter at least as large as the outer diameter of of the skirt, must be provided between the lower edge of the skirt, the ring 30 and the refractory lining 12 or the refractory sleeve brick 14, in order to allow the free movement of the skirt during the vertical displacements of the bar 22. To this effect, this annular free space 50 is at least as high as the maximum height of the clearance, and preferably distinctly higher, so that materials that would otherwise penetrate by infiltration into this annular space 50, cannot fill it up progressively, as this would with time entail the risk of blocking the movements of the electrode 2.

As shown, this space 50 stretches itself preferably out to the collar 48, in which openings 52 are provided in order to bring the space 50 in communication with the exterior of the furnace.

The invention is not limited to the two embodiments described herebefore as examples only.

More particularly, the ring 30 could also include, in the case of the first embodiment, a tubular part surrounding the connector 24 and extending itself upwardly, provided the upper edge of this tubular part remains sufficiently close to the wall of the bottom of the furnace so as to be in a cooled area which cannot be reached by liquid infiltrations.

Also, in the second embodiment, the bottom of the space delimited between the connector and the skirt can be situated lower or slightly higher as compared to the upper face of the connector.

The elastic return movement system of the electrode can be constituted by other means than the springs 40. In particular the return movement effort can be exercised by electric connecting means linked to the connector.

The invention is applicable particularly to the direct current arc furnaces for the treatment of metallic material, especially the melting of steel, but also, in a general manner to any metallurgical container which comprises an electrode that is passing through its wall, in a perpendicular or an inclined direction with respect to this wall, and which is liable to sustain axial displacements, transversally to this wall.

I claim:

1. Metallurgical container comprising:

a vessel having an inner refractory lining and a bottom wall;

a hearth bottom electrode extending through the bottom wall of the vessel and through the refractory lining, said bottom electrode comprising and comprising in a superposed condition, 1), a bar which is flush with surface of the refractory lining and 2) a connector which is fastened under the bar, the connector being internally cooled, having an outer diameter smaller than that a diameter of the bar, and being attached to the bar at an upper front face of the connector at a level situated within a thickness of the refractory lining, and a ring, which is interlocked to the bottom wall, which surrounds the connector, and which has an upper face 1) located below the bar and 2) capable of contacting and supporting the bar, wherein the bar includes a skirt which extends downwardly towards the bottom wall and which surrounds the connector laterally.

2. Metallurgical container comprising:

a vessel having an inner refractory lining and a bottom wall;

a hearth bottom electrode extending through the bottom wall of the vessel and through the refractory lining, said bottom electrode comprising, in a superposed condition, a bar which is flush with surface of the refractory lining and a connector which is fastened under the bar, the connector being internally cooled, having an outer diameter smaller than the diameter of the bar, and being attached to the bar at an upper front face of the connector at a level situated within a thickness of the refractory lining, and a ring, which is interlocked to the bottom wall, which surrounds the connector, and which has an upper face located below the bar, wherein the bar includes a skin which extends downwardly towards the bottom wall and which surrounds the connector laterally, and wherein an inner diameter of the skirt is larger than the outer diameter of the connector, and wherein an upwardly extending part of the ring penetrates upwardly between the skin and the connector.

3. Container according to claim 2, characterized in that an annular space, having an outer diameter at least as large as an outer diameter of the skirt, is provided between a lower edge of the skirt, the ring, and the refractory lining.

4. Container according to claim 2, characterized in that an upper edge of the ring is located substantially at a level of the upper front surface of the connector.

5. Metallurgical container comprising:

a vessel having an inner refractory lining and a bottom wall;

a hearth bottom electrode extending through the bottom wall of the vessel and through the refractory lining, said bottom electrode comprising, in a superposed condition, a bar which is flush with surface of the refractory lining and a connector which is fastened under the bar, the connector being internally cooled, having an outer diameter smaller than that a diameter of the bar, and being attached to the bar at an upper front face of the connector at a level situated within a thickness of the refractory lining, and a ring, which is interlocked to the bottom wall, which surrounds the connector, and which has an upper face located below the bar capable of contacting and supporting the bar, wherein the bar includes a skirt which extends downwardly towards the bottom wall and which surrounds the connector laterally, and wherein the ring is located beneath a lower edge of the skirt.

6. Container according to claim 5, characterized in that the skirt is in contact with the connector.

7. Container according to claim 1, characterized in that the ring comprises cooling means.

8. Container according to claim 1, further comprising elastic return movement means for exerting, upon the hearth bottom electrode, a return force directed toward an exterior of the container.

9. Container according to claims 1, wherein said container is a direct current arc furnace for treating metal bearing materials.

10. A metallurgical container comprising:
- a vessel including a bottom wall and a refractory lining extending upwardly from the bottom wall;
- a hearth bottom electrode extending through the bottom wall of the vessel and into the refractory lining, the hearth bottom electrode including, in a superposed relationship, 1) a metal bar, and 2) an internally cooled connector superposed with the bar, connected to the bar, and extending downwardly from the bar, and
- a ring which is interlocked to the bottom wall of the vessel, which surrounds the connector, and which has an upper surface,
- wherein the bar includes a skirt which projects downwardly towards the bottom wall of the vessel and which surrounds the connector, and wherein
- at least a portion of the bar including the skirt is movable vertically with respect to the ring, upon thermal expansion of the bar, from a first position in which the bar contacts and is supported on the upper surface of the ring to a second position in which a space is formed between the upper surface of the ring and the bar.

11. Container according to claim 10, wherein an inner diameter of the skirt is larger than an outer diameter of the connector, and wherein an upwardly extending part of the ring penetrates upwardly between the skirt and the connector.

12. Container according to claim 11, wherein an annular space, having an outer diameter at least as large as an outer diameter of the skirt, is formed between a lower edge of the skin, the ring, and the refractory lining.

13. Container according to claim 11, wherein an upper edge of the ring is located substantially at a level of an upper front surface of the connector.

14. Container according to claim 10, wherein the skirt terminates in a bottom edge located above an upper surface of the ring.

15. Container according to claim 14, wherein the skin contacts the connector.

16. Container according to claim 10, wherein the ring has channels formed therein through which a cooling fluid circulates.

17. Container according to claim 10, further comprising elastic return movement means for exerting, upon the hearth bottom electrode, a return force which urges the hearth bottom electrode toward an exterior of the container.

18. Container according to claims 10, wherein said container is a direct current arc furnace for treating metal bearing materials.

* * * * *